United States Patent
Bunton et al.

(10) Patent No.: US 6,728,909 B1
(45) Date of Patent: Apr. 27, 2004

(54) DATA COMMUNICATION WITH SPECULATIVE RECEPTION OF DATA IN A DATA PROCESSING SYSTEM

(75) Inventors: William P. Bunton, Pflugerville, TX (US); David A. Brown, Austin, TX (US); John C. Krause, Georgetown, TX (US); Charles E. Peet, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 379 days.

(21) Appl. No.: 09/670,854

(22) Filed: Sep. 26, 2000

(51) Int. Cl.[7] .................................................. G06F 11/00
(52) U.S. Cl. .......................... 714/49; 714/52; 714/776; 713/160
(58) Field of Search ........................... 714/49, 52, 776; 709/229; 713/160, 161, 201

(56) References Cited

U.S. PATENT DOCUMENTS

| | | | | |
|---|---|---|---|---|
| 4,692,917 A | * | 9/1987 | Fujioka | 370/392 |
| 5,121,396 A | * | 6/1992 | Irvin et al. | 714/807 |
| 5,208,810 A | | 5/1993 | Park | 370/94.1 |
| 5,268,900 A | | 12/1993 | Hluchyj et al. | 370/94.1 |
| 5,557,751 A | | 9/1996 | Banman et al. | 395/250 |
| 5,574,849 A | | 11/1996 | Sonnier et al. | 395/182.1 |
| 5,592,536 A | * | 1/1997 | Parkerson et al. | 455/462 |
| 5,675,579 A | | 10/1997 | Watson et al. | 370/248 |
| 5,687,314 A | * | 11/1997 | Osman et al. | 714/49 |
| 5,694,121 A | | 12/1997 | Krause et al. | 340/825.5 |
| 5,710,549 A | | 1/1998 | Horst et al. | 340/825.5 |
| 5,835,726 A | * | 11/1998 | Shwed et al. | 709/229 |
| 5,860,136 A | * | 1/1999 | Fenner | 711/201 |
| 5,867,501 A | | 2/1999 | Horst et al. | 370/474 |
| 5,935,245 A | * | 8/1999 | Sherer | 713/200 |
| 6,049,889 A | * | 4/2000 | Steely et al. | 714/4 |
| 6,108,583 A | * | 8/2000 | Schneck et al. | 700/9 |
| 6,151,689 A | * | 11/2000 | Garcia et al. | 714/49 |
| 6,163,843 A | * | 12/2000 | Inoue et al. | 713/201 |
| 6,163,844 A | * | 12/2000 | Duncan et al. | 713/201 |
| 6,331,829 B2 | * | 12/2001 | Kawai | 341/94 |
| 6,343,323 B1 | * | 1/2002 | Kalpio et al. | 709/229 |
| 6,480,972 B1 | * | 11/2002 | Cromer et al. | 714/25 |
| 6,490,705 B1 | * | 12/2002 | Boyce | 714/776 |
| 6,522,665 B1 | * | 2/2003 | Suzuki et al. | 370/471 |

FOREIGN PATENT DOCUMENTS

| | | | | |
|---|---|---|---|---|
| WO | WO009923538 A1 | * | 5/1999 | G05B/13/02 |

* cited by examiner

*Primary Examiner*—Robert Beausoliel
*Assistant Examiner*—Gabriel Chu (57) ABSTRACT

A multiprocessor or clustered system with processing elements communicatively interconnected transmits and receives data in the form of message packets. Certain of the message packets are either responding to earlier requests with the data, or are requests that the data of the packet be written at the destination. Each message packet has an initial portion that includes information about the packet, including what the data is carrying (i.e., data in response to an earlier request, or data to be written), the source and ultimate destination of the message packet. This information prevents errant data being written at the destination by determining if the source has "permission" to send such data to the destination. When a message packet carrying data is received, processing of the packet is started in parallel with continued reception of the data it carries by using the information contained in the initial portion to check the permissions.

8 Claims, 5 Drawing Sheets

DATA COMMUNICATION WITH SPECULATIVE RECEPTION OF DATA IN A DATA PROCESSING SYSTEM

FIELD OF THE INVENTION

The present invention pertins generally to multiprocessor and clustered systems, and more particularly to a method for speculatively receiving data in the form of message packets to expedite message traffic between communicatively interconnected elements of a multiprocessor system.

BACKGROUND OF THE INVENTION

Many computing and processing systems today are collections of separate processing elements of one type or another that are interconnected by a data network for data communication. Wide area networks (WANs), local area networks (LANs), or system area networks (SANs) are a few examples of such interconnective networks. Many of these networks use a communication protocol that transmits information in the form of packets, an initial portion of which (often termed the "header") contains information about the packet (e.g., its source and destination) and its content (e.g., if it carries data, a description of that data, and what is to be done with it). Whatever form the interconnection takes, efficient operation of the system as a whole depends, in part, upon the network architecture being able to provide fast, well-organized transfers of data between the system elements. Typically, that design will incorporate switches or routers that route message traffic through the various communication paths of the network, from one element of the system to one or more other elements of the system. Presently available switch designs are able to improve communication efficiency by a data-handling capability that uses latency reduction techniques. See, for example, U.S. Pat. Nos. 5,694,121 and 5,710,549, which deal with techniques for granting path access to multiple contending messages.

Other techniques for enhancing the network communication efficiency involve focusing on the topology of the network interconnect in an effort to remove or at least minimize loops and resultant deadlock. For example, massively parallel processing (MPP) systems may use hundreds if not thousands of interconnected processing elements and associated input/output equipment (e.g., disk storage, communications devices, printers, and the like). Communication between elements of an MPP system will require high band-width connections in order to reduce inter-element latency of message traffic to keep the system running as efficiently as possible.

Lacking proper design, a network is open to the possibility of a "deadlock" being created. This situation results when groups of messages cannot make further progress through the communicating network because of a circular dependency in which each message packet must wait for another to proceed before acquiring access to a communication link. But, even with a well designed interconnect or network topology, deadlock can occur when the destination is incapable of receiving messages as quickly as they are sent. Sluggish reception at a destination can cause message packets to back up through the interconnect and possibly impede message packet traffic bound for other system elements. Thereby, the effectiveness of the interconnect design is reduced—particularly during periods of high message traffic. This problem is particularly apparent in high speed interconnect schemes, and is exacerbated with the growth of the system.

One approach to reducing this problem is to provide the destination with sufficient buffer storage so that when a message packet is received it is stored to await processing. However, additional buffer storage can be expensive, making the approach a costly and often prohibitive solution, particularly for high-speed operation. An alternate approach, used in co-pending patent application Ser. No. 09/606,425, filed Jun. 28, 2000, for "Network Deadlock Avoidance Using Other Memory to Buffer Received Packets" is to use a buffer size sufficient to handle typical message traffic, but to use memory already available to spill messages to when the buffer becomes full during periods of heavy message traffic at the destination.

In addition, those protocols that use an initial portion ("header") of the packet to provide particulars about the packet (its source, destination, content, etc.) can make a sluggish destination even more so. The reason being that header information is used, for example, to authenticate the packet (e.g., to verify that the source is authorized to do what the packet desires, etc.). However, before any verifications are made, the usual procedure is to receive the entire packet, check its correctness, and then proceed to authenticate the packet. For packets carrying large amounts of data, this can take some time.

Thus, it can be seen that there still exists a need for handling incoming message traffic at the receiving end in order to relieve message traffic-crowding on the network interconnect—particularly for systems that require high speed data communication between various of the system elements.

SUMMARY OF THE INVENTION

The present invention provides a processing system with a method of speculative reception of message packets containing data and other information. In particular, the invention is most advantageously used in systems of the type in which at least certain of the message packets include a header to describe the content of the packet.

Broadly, the invention involves initiating processing of the message packet after the header is received, but before the remainder of the packet is received and its correctness verified. Such processing may include determining that the source of the message packet is authorized to provide data to the recipient destination. When the entire message packet is received, an error-checking code which concludes the packet is checked, and if there is no error found, processing is completed by routing the data to its intended location at the destination element (e.g., a memory of a CPU). If, however, the error-checking indicates that the data or the message packet contains an uncorrectable error, the data will either be stored for later review, or discarded, depending upon the type of error.

A number of advantages are achieved by the present invention. First, early initiation of processing the message packet, before it is received in its entirety, allows a receiving element to ready itself much faster for receiving a subsequent message packet. This, in turn, leads to the advantage of keeping traffic moving on the interconnections used to communicate the system's elements to one another and lowering traffic congestion on that interconnect.

These and other advantages and features of the present invention will become apparent to those skilled in this art upon a reading of the following description of the specific embodiments, which should be taken in conjunction with the accompanying drawings.

DESCRIPTION OF THE SPECIFIC EMBODIMENTS

Figure 1:
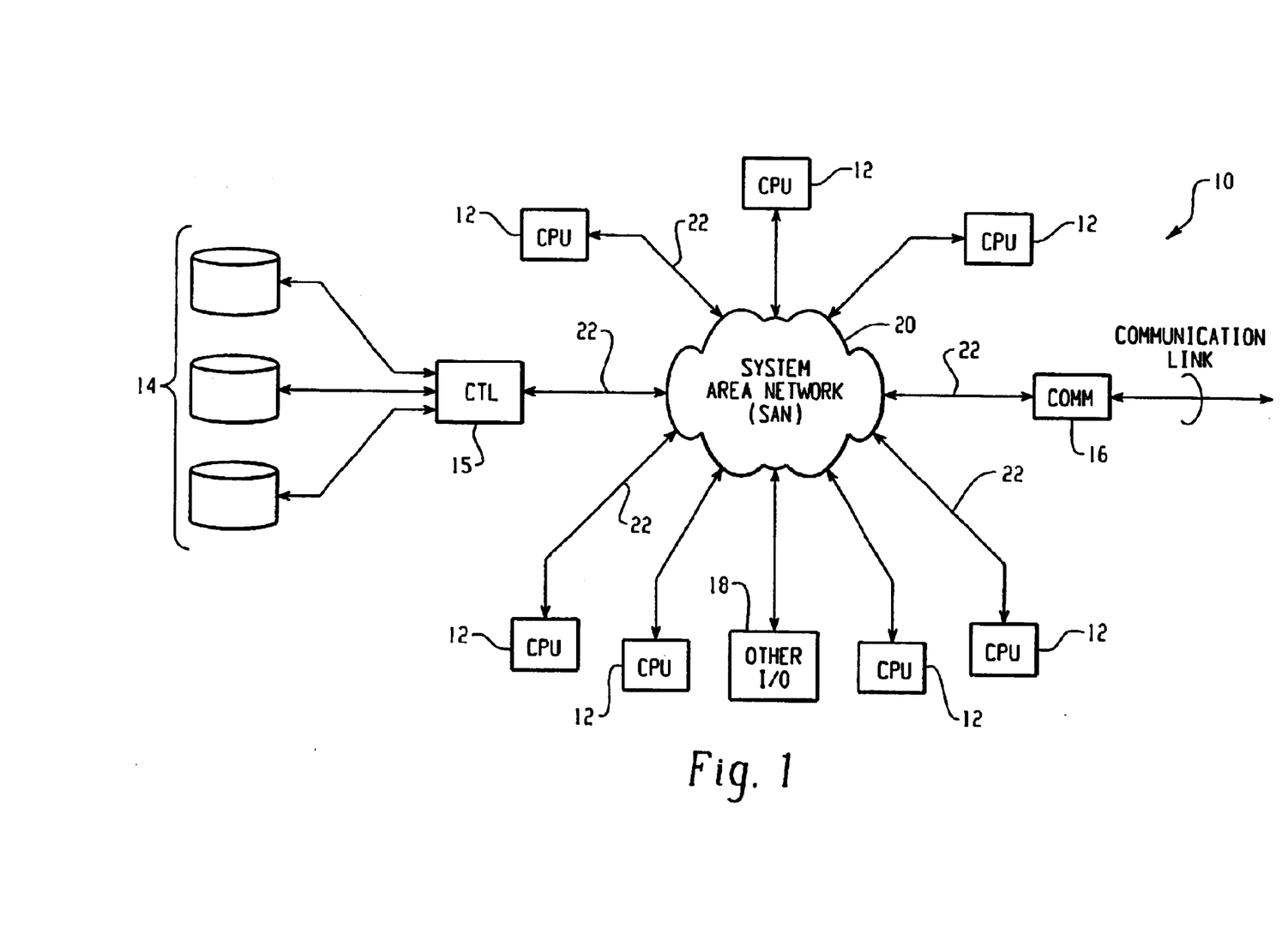
FIG. 1 is an illustration of a representative processing system for implementing the present invention.

Turning now to the figures, and specifically with reference to FIG. 1, there is illustrated a multiprocessing system or cluster, designated generally with the reference numeral 10, advantageously structured to employ the present invention. As FIG. 1 shows, the system 10 includes a number of central processing units (CPUs) 12 communicatively coupled to various input/output (I/O) elements 14–18 such as a disk system 14 (with a controller 15), communications system 16, and "other" I/O 18. The elements 12–18 of the system 10 are interconnected by a system area network (SAN) 20. Preferably, for fault tolerant capability, each of the CPUs and I/O elements 14–18 have dual connections to the SAN 20, although that is not necessary to the implementation and operation of the present invention. In addition, the SAN 20 is preferably constructed along the lines taught in U.S. Pat. No. 5,751,932 such that the SAN 20 will include various switches ("routers") operable to route message packets between the elements 12–18 of system 10. U.S. Pat. No. 5,751,932 is hereby incorporated by reference to the extent necessary for disclosure of the invention.

The elements of system 10 are preferably designed with the capability of transferring information and data to and from the memory (not shown) of each of the CPUs 12 in a manner that does not involve the main processing element (e.g., microprocessor) of that element. Rather, each CPU 12 includes state machine-based logic that operates independent of the main processing element to receive and respond to requests for data to be stored or read from the memory of the CPU. Although it will be evident to those skilled in this art that all such information requests can be handled by the main processing element of the particular device, using a state-machine based logic, particularly for the CPUs 12, permits the main processing element to attend to more critical, time-sensitive tasks.

Figure 2:
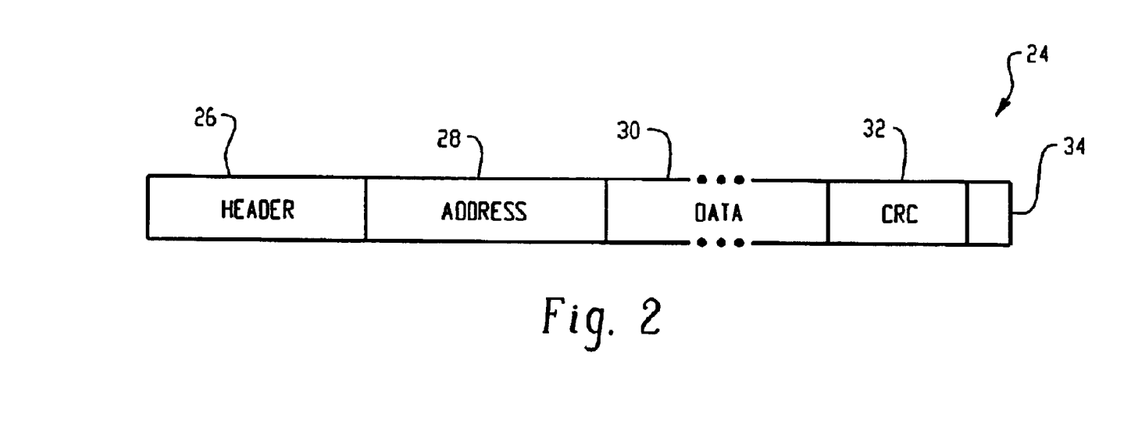
FIG. 2 is illustration of the format of a message packet used to communicate data and/or control information between the elements of the system of FIG. 1.

A preferred form (of the many available) for packaging the information transferred between CPUs 12 is illustrated in FIG. 2. As FIG. 2 shows, information is conveyed using a packet 24 that includes a header field 26, an address field 28, a data field 30, CRC field 32, and terminates with a terminator tag 34 that marks the end of the packet. The header field 26 carries such information as (1) the intended destination of the packet, (2) the source of the packet, and (3) the type of the packet. A packet may be one of four basic types: a request for data to be read (Read request) or data to be written (Write Request), or a response to such a request (Read Response or Write Response).

The header field 26 is followed by the address field 28 that specifies a location of data. If the packet carries data, and is a Write Request, the address field specifies where the data, carried in the data field 30, is to be written at the destination. If the packet is a Read Response, the address field is not used. (A Read Response carries data specified by an earlier sent Read Request. The address to be used for the data of the Read Response is maintained by the requesting CPU 12.) The data field 30 can hold up to 512 bytes of data, although it will be evident that other sizes can be used. Multiple message packets are used to carry larger amounts of data.

The packet 24 concludes with an error-correcting/checking code, here a conventional cyclic redundancy check (CRC) code, and the terminator tag 34. In addition, the terminator tag 34 indicates whether or not a prior element of the system (e.g., one of the switches—not shown—of the SAN 20) found an error in the packet when routing it to its destination. Accordingly, the bit sequence used to identify the end of the packet can take on one of two forms: one to indicate "this packet good" (TPG), or one to indicate "this packet bad" (TPB).

Read Requests may be sent by a CPU 12 to the disk system 14, for example, requesting certain data specified (by the address, address field 28) in the Request, or Read Requests may be sent to other CPUs 12, requesting data from a memory location of the CPU—also specified by the content of the address field 28. The recipient of a Read Request would then reply via a Read Response, either with the data requested or a reason why the request could not or is not complied with. If the Read Response carries the requested data, the information may be received and processed by using the header information to verify the authenticity of the response. Such processing includes using the transaction number (in the header field) to match it with outstanding transactions, and then verifying that the source of the packet, also identified in the header, is the proper source, and that the data is the proper size. If processing properly verifies and authenticates the packet, it is written to the memory of the requesting CPU without need of intervention of the main processing element (microprocessor—not shown of that CPU. Rather, all this is handled by the receive logic (not shown) and the main processing element is notified of receipt of the data. The main processing element can then use the data as necessary when it is ready, not when that data is received. An example of use of this type of system may be found in the referenced U.S. Pat. No. 5,751,932.

Permitting the memory of any CPU to be accessed by any other element of the system (i.e., other CPUs and even peripheral devices when returning requested data) gives rise to the need to protect against inadvertent and/or unauthorized access. Thus, in connection with this need, each CPU maintains an access validation and translation table (AVTT) containing entries for each element of the system 10, including CPUs, that is authorized to access the memory of that CPU. Each such entry will include information as to the type of access permitted (e.g., a read or write to memory), and where in memory that access is permitted. Message packets that are routed through the SAN 20 are created, as indicated above, with information describing the originator of the message packet, the destination of the message packet, what the message contains (e.g., data to be written at the destination, or a request for data to be read from the destination), and the like. The header information, in addition to permitting the message packet to be routed to its ultimate destination expeditiously, provides the receiving CPU with information to allow it to retrieve the AVTT entry pertaining to the source of the message packet. The receiving CPU can then check to see if access is permitted, and if so what type and where the receiving CPU chooses to Remak (i.e., translate) the address. In this manner the memory of any CPU is protected against errant accesses. The AVTT is also used for passing externally generated interrupts to the CPU.

The AVTT assures that a CPUs memory is not corrupted by faulty I/O devices. Access rights can be granted for memory ranging in size from 1 byte to a range of pages. This fault containment is especially important in I/O, because the system vendors of systems usually have much less control over the quality of hardware and software of third-party peripheral suppliers. Problems can be isolated to a single I/O device or controller rather than the entire I/O system.

Figure 3:
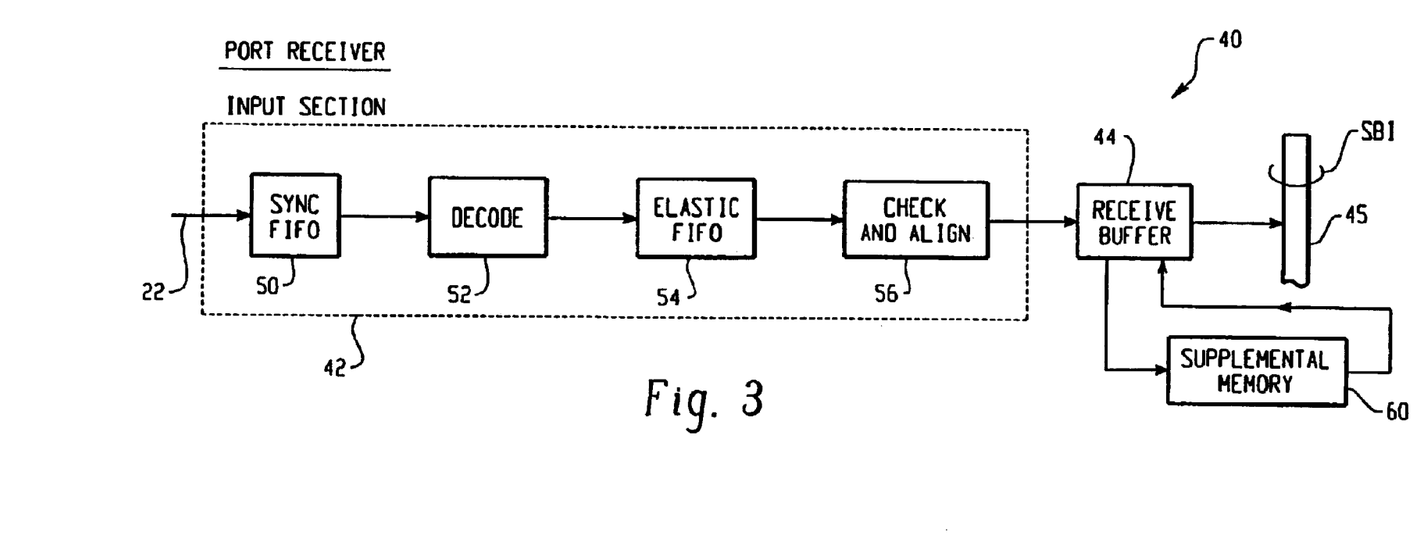
FIG. 3 is a block diagram illustration of a port receiver of an element of the system of FIG. 1, broadly showing the receive buffer and supplemental memory used to implement the present invention.
Figure 4:
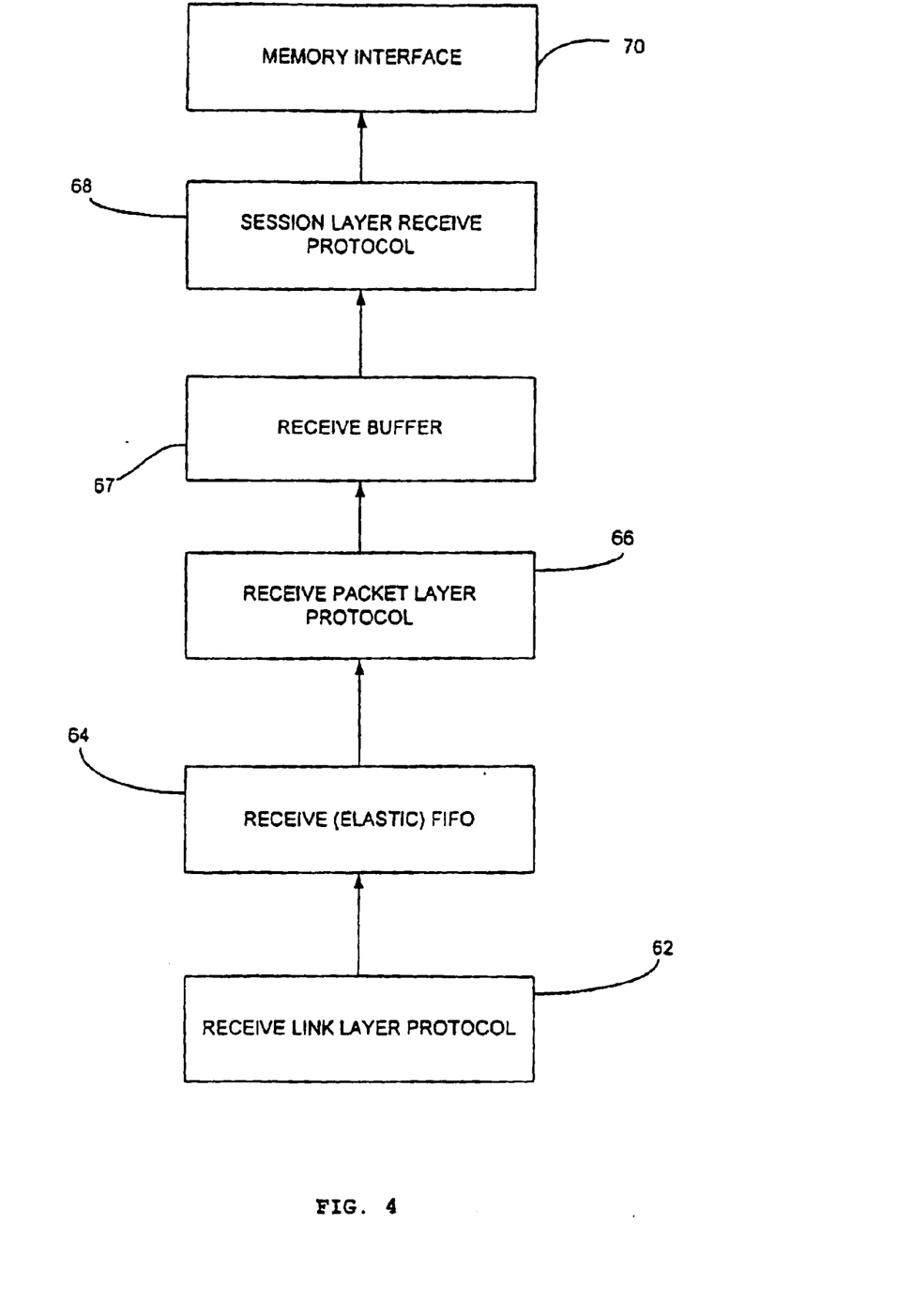
FIG. 4 is a block diagram of the protocol stack used to receive message packets by the port receiver of FIG. 3.

Shown in FIG. 3 is a port receiver 40 that is structured to implement the link layer level of the Open Systems Interconnect OSI reference model protocol stack (FIG. 4). The port receiver 40 basically forms the logical path for data from the SAN 20 to the memory of a CPU 12, providing the logic needed to implement the protocol stack shown in FIG. 4. In addition to the CPUs 12, each of the elements 14–18 of the system 10 (FIG. 1) would preferably include a form of the port receiver 40 as the receiver of message packets from the SAN 20.

As FIG. 3 shows the port receiver 40 includes an input section 42 and a receive buffer 44. The input section 42, in turn, includes a synchronization FIFO 50, a decode unit 52, an elastic FIFO 54, and a check/align unit 56.

Synchronization FIFO 50 operates to receive the message packet from the link 22 that connects to the SAN 20, matching the clock frequency with which the packet is transmitted on the link 22 with that of the receiving element. A more complete description of the synchronization FIFO and its function may be found in the aforementioned referenced U.S. Pat. No. 5,751,932.

From synchronization FIFO 50, the received message packet is then passed to a decode unit 52 where the packet is examined for any special codes, and where the type of the packet determined. In addition, if the packet is encoded for transmission (e.g., conventional 8B/10B coding), the packet is decoded. The packet is then passed to and temporarily stored in the elastic FIFO 54. From the elastic FIFO 54, the packet is passed to the check/align unit 56 where CRC of the packet is compared to that developed when the packet was received. In addition, the packet is aligned in four byte blocks for storage in the receive buffer 44. Message packets stored in the receive buffer 44 may then be made available, via the system interconnect bus (SIB) 45, to the various elements of the transport layer of the OSI protocol stack (not shown), i.e., the memory (not shown) of a CPU 12 or other storage element.

When the check/align 56 unit forwards the message packet to the receive buffer 44, handshake signals between the check/align unit 56 and the receive buffer 44 will inform the receive buffer that the message packet is valid, and identify the message packet type. In turn, the receive buffer will store it in one of the buffers, according to the identified type (i.e., whether or not it carries data)—with the associated header. A buffer that contains a message takes on the type of that message while the message is held. For example, a buffer holding a write request becomes a write request buffer until that write request is processed and the buffer free to accept another packet. If that next packet is a read response, the buffer then becomes a read response buffer.

Message packets are received by the port receiver 40 one packet at a time, in ordered fashion, and stored in the receive buffer 44 in the order received—according to type. The receive buffer 44 is logically partitioned into two different sizes of packet buffers. Three large buffers, each comprising sixty-eight, eight-byte double words, are used for storing message packets that carry data, i.e., read responses and write request message packets. Seventeen small buffers, each comprising three double words, are used for storing message packets that carry no data: write responses or read requests.

Once a message is stored in the receive buffer 44, it is made available (i.e., notification of the message packet provided) to the transport layer, which will usually pass the data of the packet (if it carried data) to memory (not shown). Although, as mentioned above, packets are stored in the order received—according to type—they may be withdrawn from the storage RAM 74 out of order, depending upon the availability of the transport layer for which the particular message packet is destined. That is, a read request message packet may be taken from the receive buffer 44 before a prior-received write response message packet; or, a read response message packet may be removed by the transport layer before a prior received write request message packet.

The protocols used for handling the receipt of incoming message packets for storage in the Receive buffer 44 until it can be transferred to memory (not shown) for use by the CPU 12, are illustrated by the protocol stack shown in FIG. 4. As indicated above, the logic implementing the protocols is shown in FIG. 3. Receipt of a message packet begins at the link layer protocol block 60, implemented principally by the decode circuit 52 of the port receiver 40 (FIG. 3). The decode circuit 52 operates to manage flow control (e.g., to temporarily halt receipt of a message packet when the elastic FIFO 54 is nearing a full state), extract from the packet various control characters used for e.g., flow control. And decode the individual elements ("symbols") of the packets, which may be encoded in, for example, the conventional 8B–10B format. After decoding, the message packet is passed to the elastic FIFO 54 (per protocol block 64) where it is kept until a buffer in the receive buffer 44 can be made available, if not already available, and allocated for the packet. When a buffer is allocated, whatever is stored in the elastic FIFO 54 at the time is then retrieved by the check and align circuit 56 and transferred to one of the buffer queues of the receive buffer 44 under the control of the Receive Packet Layer Protocol block 66. Operation of the Receive Packet Layer Protocol is illustrated by the flow diagram of FIG. 5, and is implemented primarily by the check and alignment circuitry 56.

Figure 5:
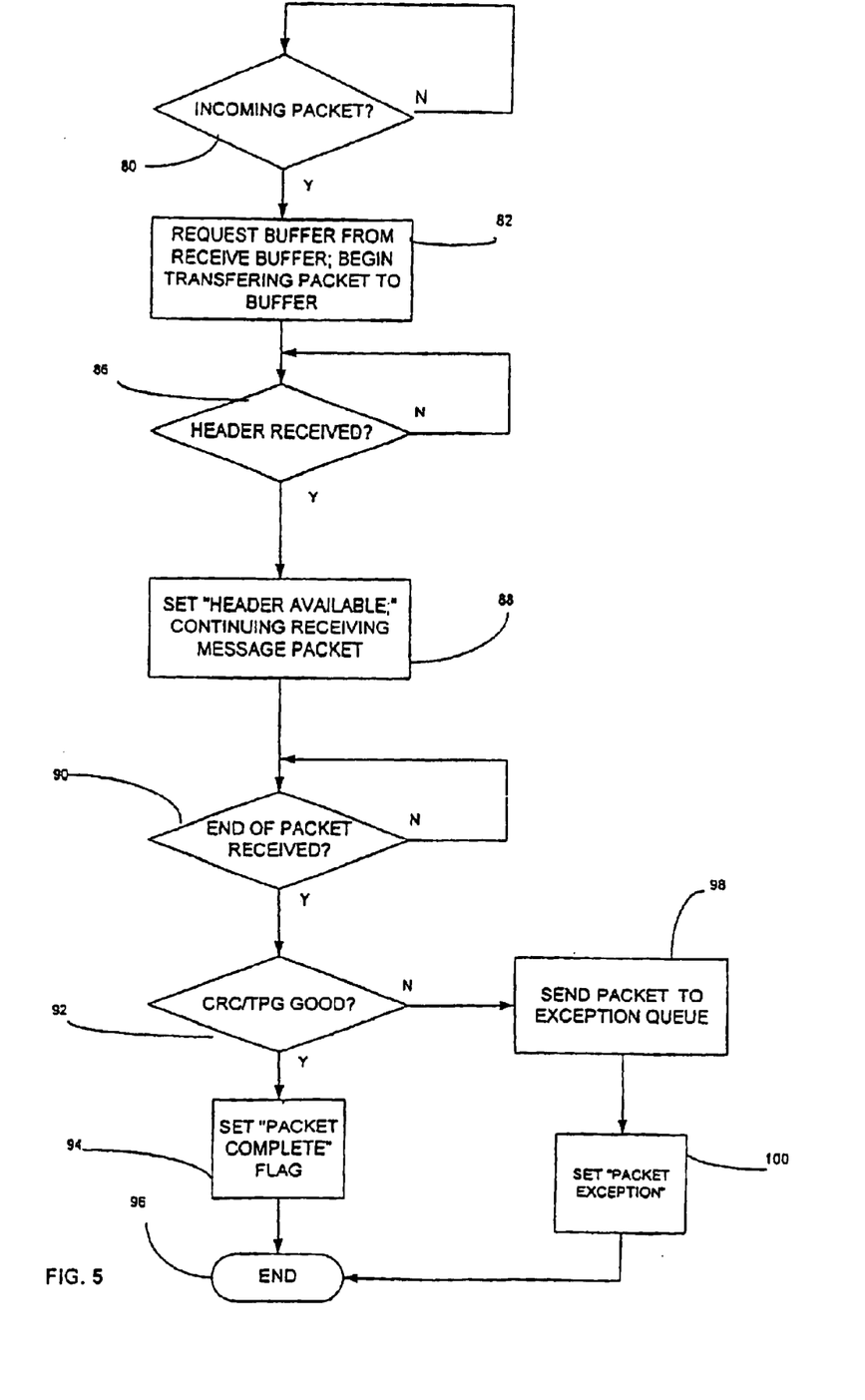
FIG. 5 is a flow diagram illustrating the operation of the receive packet layer protocol by the port receiver of FIG. 3.

Turning to FIG. 5 for the moment, the Receive Packet Layer protocol begins with a wait sate 80 until an incoming message packet is being received by the elastic FIFO 54. Then, when notified by the elastic FIFO 54 (i.e., the receive (Elastic) FIFO Protocol 64), the Receive Packet Layer Protocol and the check and align circuit 56 (and associated logic—not shown) will move to step 82 to request a buffer for storing the incoming message in the receive buffer 44 until it can be presented to the transport layer via the SBI 45. Thus, if a buffer is granted, the incoming message packet will be transferred from the elastic FIFO 54 to the assigned buffer in the receive buffer 44.

Step 86 checks to see if the header of the incoming message packet has been received. If so, step 88 sets a "Header Available" flag, indicating that the header is available in the receive buffer for processing, and receipt of the message packet continues, until the end of the message packet is detected at step 90. Then, the CRC 32 and terminator tag 34 of the message packet are checked in step 92. If both are found to be good, a "Packet Complete" flag is set, and the Receive Packet Layer Protocol is finished and exits via step 94 to set a "Packet Complete" flag, and ends at step 96.

On the other hand, if the CRC is found to be bad and uncorrectable, the received message packet, at step 98, will be sent to an exception queue for later examination and processing. At step 100, a "packet Exception" flag is set before proceeding to exit via the end step 96. If, however the terminator tag is found to have been set to the TPB state, indicating that an upstream element of the system (e.g., a switch on the SAN 20—not shown) has already found the message packet to be bad, and therefore, unreliable, the message packet will simply be discarded.

The Receive Buffer block 67, implemented by a collection of state machines (not shown) that forms a part of the receive buffer 44, is responsible for managing the buffer pools of the receive buffer 44 (FIG. 3). Buffers are granted to the Receive Packet Layer Protocol as they are needed Completed good packet buffers and large buffers with complete packet headers are presented to the Session Layer Receive Protocol for processing, including access validation and address translation.

Figure 6:
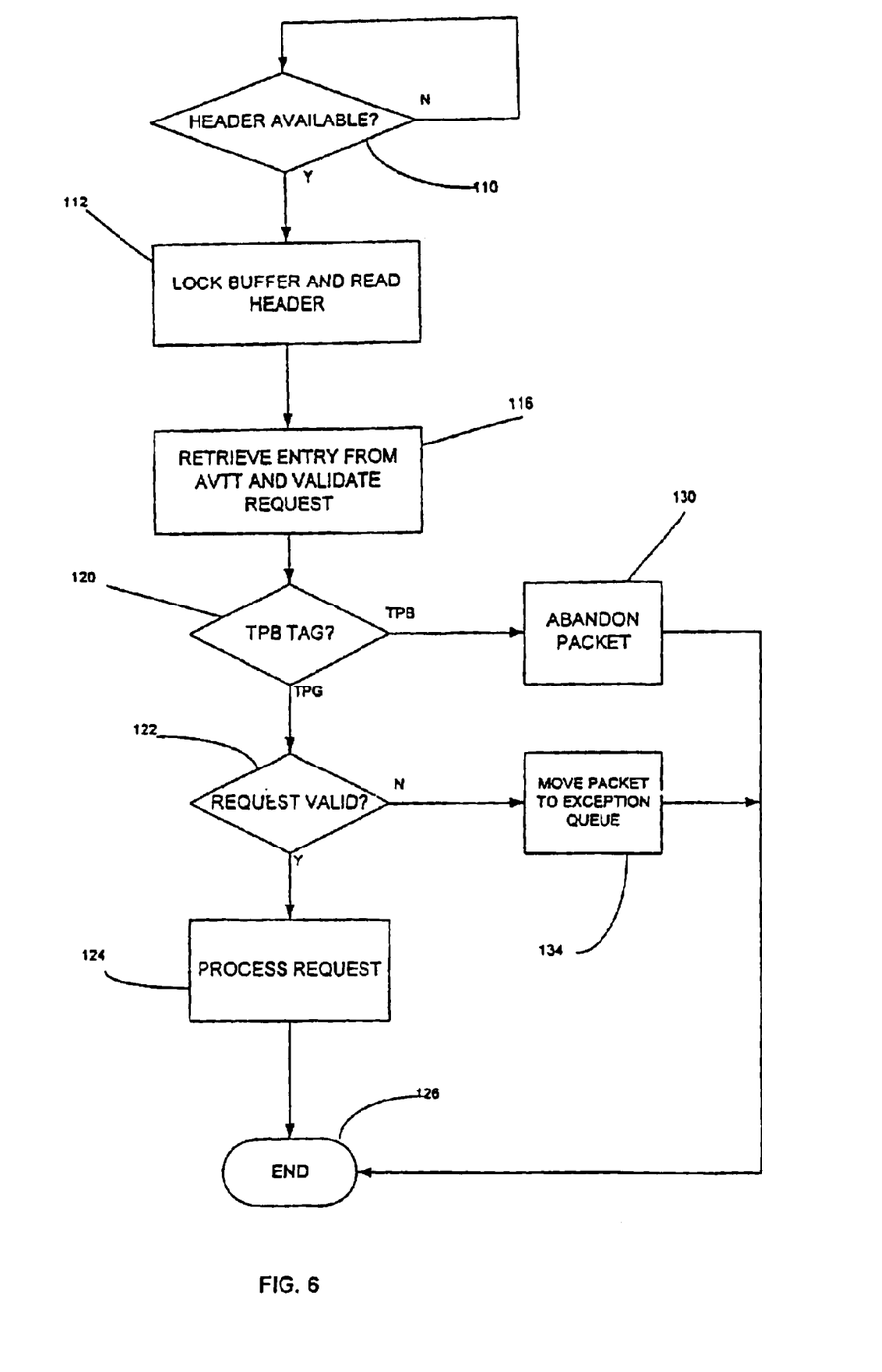
FIG. 6 is a flow diagram illustrating of the session layer protocol by the port receiver of FIG. 3.

Referring now to FIG. 6, the operational overview of the Session Layer is illustrated, showing the principle steps taken according to the present invention for incoming messages that are assigned a larger buffer, i.e., those that carry data. The Session layer begins at step 110 by exiting a wait state in favor of step 112, in which the header is read from the receive buffer 44. (In the case of message packets carrying no data, a write response or read request, most likely the entire packet has been received and stored. The following discussion concerns message packets that carry data.) With the header, the Session Layer can determine what the packet is about, i.e., what is the source of the packet, what type of packet is it (i.e., a write request or a read response). Processing of the packet can begin while the data carried by the packet is still being received.

With the information describing the message packet contained in the header, the Session Layer, at step 116, will access the AVTT entry pertaining to the source of the message packet and make various checks to determine the validity of the packet and verify the permissions that it may by making. For example, the message packet may be a Write Request, seeking to write the data it carries to an area of memory. The AVTT entry will contain information that specified first if the source of the message packet has the right to write data to the memory of the receiving entity, and if so where and how much. A Read Response will be similarly verified with checks to see if the data carried is a response to a read request sent by the receiving entity, and if so does the size and other aspects of the data conform to what was requested.

Meanwhile, the incoming message packet continues to be received by the input section 40 (FIG. 3). Ultimately, the end of the message packet will be received and checked in steps 120 and 122. At step 120, the TPG tag is checked, and if still set to a TPG indicator, a check of the determination made during step 116 will be made at step 122, i.e., is this a valid request? If so, the request will be processed. If it is a Write request, the data carried will be written to memory, in the case of a processor unit 12, or to some form of storage (e.g., I/O 14 or 18), and the Session Layer ends (step 126).

If the TPG tag is found to have been changed in step 120, the packet will be discarded in step 130 and the Session Layer processing ended. On the other hand, if the TPG tag found to be OK, but the request for some reason is found in step 122 to be invalid, the packet will be moved to an exception queue in step 134, and the Session Layer ended.

What is claimed is:

1. A method for processing information transmitted from a data transmitting element to a data receiving element, the information formatted as a plurality of message packets each having header information, data and an error detection and correction code, the header information including at least one permission relating to the data transmitting element or the data receiving element, the method comprising the steps of:

receiving the header information of at least one of the message packets;

receiving the data from the at least one of the message packets;

receiving and checking the error detection and correction code to determine the validity of the at least one of the message packets; and prior to completion of receipt of the data from the at least one of the message packets and prior to completion of receiving and checking the error detection and correction code, initiating processing of the header information to determine whether the permissions are correct for allowing transmission of the data between the data transmitting element and the data receiving element.

2. The method of claim 1, wherein the at least one of the message packets is a write request and the header information includes at least one address field, the method further comprising:

initiating processing of the address field prior to completion of receipt of the data.

3. The method of claim 1, wherein the at least one of the message packets is a read response and the header information includes a header field, the method further comprising:

initiating processing of the header field prior to completion of receipt of the data.

4. The method of claim 1, wherein the data receiving element includes a receive buffer, the method further comprising:

storing the header information in the receive buffer prior to initiating processing of the header information.

5. A method for receiving a message packet transmitted over a system area network to a data receiving element, the message packet having header information and data, the header information including at least one permission relating to a data transmitting element of the system area network or the data receiving element, and the data receiving element having an access validation and translation table containing at least one entry for each element of the system area network which transmits or receives information over the system area network, the method comprising the steps of:

receiving at a data receiving element the header information of a message packet;

receiving at the data receiving element the data from the message packet; and at the data receiving element, prior to completion of receipt of the data:

reading at least one permission from the header information;

accessing the access validation and translation table to check the at least one permission; and determining whether the at least one permission is correct for allowing processing of the message packet by the data receiving element.

6. The method of claim 5, wherein the header information includes at least one address field and the at least one permission includes an address in the address field, and the access validation and translation table contains a plurality of permitted addresses, the determining step further including the step of comparing the address in the permission to the permitted addresses to determine if the address in the permission is a permitted address.

7. The method of claim 5, wherein each message packet further includes an error detection and correction code, the method further comprising:

at the data receiving element, receiving and checking the error detection and correction code to determine the validity of the message packet; and at the data receiving element, performing the reading, accessing and determining steps prior to completion of receiving and checking the error detection and correction code.

8. The method of claim 5, wherein the data receiving element includes a receive buffer, the method further comprising:

storing the header information in the receive buffer prior to performing the reading, accessing and determining steps.

* * * * *